US008010888B2

(12) United States Patent
Goodson et al.

(10) Patent No.: US 8,010,888 B2
(45) Date of Patent: Aug. 30, 2011

(54) PRODUCING INPUT TO A TRANSFORMATION ENGINE

(75) Inventors: Kelvin James Goodson, Winchester (GB); David John Vines, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 1181 days.

(21) Appl. No.: 11/257,441

(22) Filed: Oct. 24, 2005

(65) Prior Publication Data

US 2006/0136394 A1    Jun. 22, 2006

(30) Foreign Application Priority Data

Dec. 18, 2004  (GB) ................................ 0427807.3

(51) Int. Cl.
*G06F 17/00* (2006.01)
*G06F 17/20* (2006.01)
*G06F 17/21* (2006.01)
*G06F 17/22* (2006.01)
*G06F 17/24* (2006.01)
*G06F 17/25* (2006.01)
*G06F 17/26* (2006.01)
*G06F 17/27* (2006.01)
*G06F 17/28* (2006.01)
*G06F 15/16* (2006.01)

(52) U.S. Cl. ......... 715/234; 707/999.003; 707/E17.124; 709/230

(58) Field of Classification Search ................ 715/239, 715/234; 707/101, 10, 103 R, 107, 999.003, 707/E17.124; 709/230
See application file for complete search history.

(56) References Cited

U.S. PATENT DOCUMENTS

| 6,785,685 | B2 | | 8/2004 | Soetarman et al. |
| 7,016,963 | B1 | * | 3/2006 | Judd et al. ................... 709/228 |
| 7,092,967 | B1 | * | 8/2006 | Pannala et al. ............ 707/104.1 |
| 7,210,097 | B1 | * | 4/2007 | Clarke et al. ................. 715/227 |

(Continued)

FOREIGN PATENT DOCUMENTS

| WO | WO 00/73941 | | 12/2000 |
| WO | WO 0073941 A2 | * | 12/2000 |
| WO | WO 02/21291 | | 3/2002 |
| WO | WO 2004/068320 | | 8/2004 |

OTHER PUBLICATIONS

Noga et al. "Lazy XML Processing", DocEng'02, Nov. 8-9, 2002, McLean, Virginia, USA p. 88-94.*

(Continued)

*Primary Examiner* — Stephen S Hong
*Assistant Examiner* — Nicholas R Hasty
(74) *Attorney, Agent, or Firm* — Robert H. Frantz; David A. Mims, Jr.

(57) ABSTRACT

Input to a transformation engine is produced, responsive to a client computer providing a data access service (DAS) computer with XML data for transformation, by creating a graph shell and XML store for the XML data, determining if the graph has a store; and, if so, requesting an empty TrAX result; requesting to fill the empty TrAX result using TrAX source, and requesting a store parser for events related to the XML store; while avoiding wrapping by the TrAX DAS of a graph shell with TrAX source, requesting by a TrAX source of a graph for one or more nodes, requesting by a graph from a store for one or more nodes, parsing of a buffer by a store, returning events from a store to a graph, building of a graph by the same graph, returning nodes from a graph to a TrAX source; and building events by a TrAX source.

1 Claim, 7 Drawing Sheets

U.S. PATENT DOCUMENTS

| | | | | |
|---|---|---|---|---|
| 7,502,996 B2* | 3/2009 | Fry | ................................ | 715/236 |
| 2002/0073119 A1* | 6/2002 | Richard | ........................ | 707/513 |
| 2003/0041077 A1 | 2/2003 | Davis et al. | | |
| 2003/0041095 A1* | 2/2003 | Konda et al. | ................... | 709/201 |
| 2003/0126556 A1 | 7/2003 | Soetarman et al. | | |
| 2003/0135825 A1* | 7/2003 | Gertner et al. | ................. | 715/513 |
| 2004/0025117 A1 | 2/2004 | Ingersoll et al. | | |
| 2004/0148571 A1 | 7/2004 | Lue | | |
| 2004/0186915 A1* | 9/2004 | Blaszczak et al. | ............ | 709/246 |
| 2005/0055629 A1* | 3/2005 | Khaladkar et al. | ............ | 715/513 |
| 2006/0031233 A1* | 2/2006 | Liu et al. | ........................ | 707/100 |

OTHER PUBLICATIONS http://www.w3.org/TR/xpath.

ftp://www6.software.ibm.com/software/developer/library/j-commonj-sdowmt/ComSDOmonj-SDO-Specification-v1.0.pdf.
http://eclipse.org/emf/.
http://xml.apache.org/xerces2-j/xni-config.html.
Apache Organization; "What is Data Access Service?", retrieved from http://tuscany.apache.org/das-overview.html on Jan. 2, 2011.
Wilde, Erik; "Web and XML Glossary" definition for TrAX (Transformation API for XML), retrieved from http://dret.net/glossary/trax on Jan. 2, 2011.
PC Magazine; "Definition of: XSL", retrieved from http://www.pcmag.com/encyclopedia_term on Jan. 3, 2011.
PC Magazine; "Definition of: XSLT", retrieved from http://www.pcmag.com/encyclopedia_term on Jan. 3, 2011.
Apache Organization; "Using the JAXP Transform APIs", retrieved from http://xml.apache.org/xalan-j/trax.html on Jan. 2, 2011.

* cited by examiner

PRODUCING INPUT TO A TRANSFORMATION ENGINE

FIELD OF THE INVENTION

The present invention relates to data transformation.

BACKGROUND OF THE INVENTION

In order for a client process to be able to access and manipulate data, a client may request that a program (henceforth called a Data Access Service or DAS) convert the data into a hierarchical (or other graph) structure. WO0221291 discusses conversion of certain HTML files into tree structures such that the information contained within the tree structures may be used by other application programs. WO2004068320 discusses the conversion of HTML source into a tree structure such that that tree structure can be manipulated and transformed into a simplified HTML document.

The conversion of other data formats (such as XML) into hierarchical format for the purpose of data manipulation is also known. U.S. Pat. No. 6,785,685 for example describes the parsing of XML data in order to build a DOM tree from which a dynamic data object (DDO) or extended data object (XDO) can be constructed. US2003041077 is another example of a patent that discuses the conversion of a source document into hierarchical form in order that the data contained within can be referenced. Other graph structures are known such as SDO and Microsoft's ADO (Microsoft is a registered trademark of Microsoft Corporation in the United States, other countries, or both).

Figure 1A:
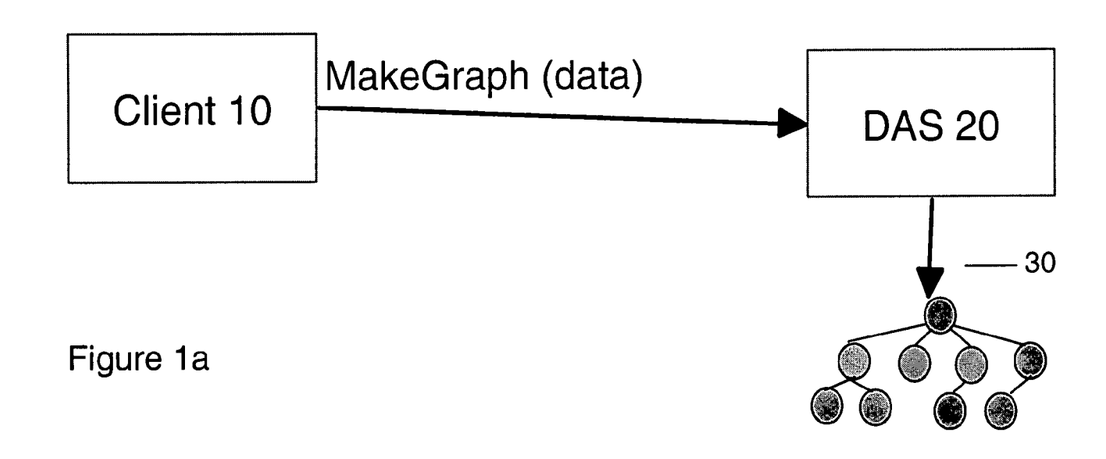
FIG. 1a illustrates the construction of a graph from data in accordance with the prior art.

A simplified overview of the processing required to construct and access a graph is illustrated by FIG. 1a. Client 10 requests DAS 20 make a graph 30 out of data "data". In the case of XML data, this may be achieved by a "Simple API for XML" (SAX) parser parsing the XML data to create events which DAS 20 can then use to build the graph 30.

Figure 1B:
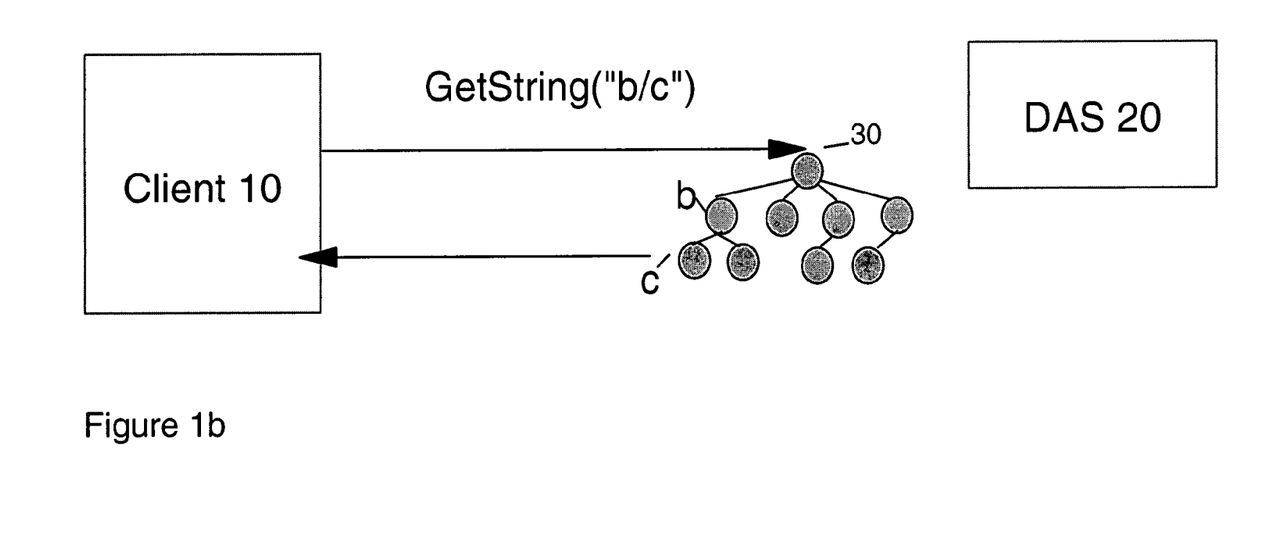
FIG. 1b shows, according to the prior art, how a client requests information from the graph constructed in FIG. 1.

As shown in FIG. 1b, when client 10 wishes to access a node within the graph 30, client 10 makes such a request (via an operation) to the graph itself. The operation traverses the existing graph according to the supplied path until the requested node is identified and sends this back to client 10 for manipulation. US2004193575 discusses modelling of an XML document as a tree of nodes and navigating the tree of nodes to address parts of the XML document, where a destination node is as a result of a path expression. The reader is also referred to the discussion of XPath at http://www.w3.org/TR/xpath.

FIGS. 1a and 1b address the situation where the complete graph is built immediately or "eagerly" when requested by the client. (For more detail, the reader should refer to ftp://www6.software.ibm.com/software/developer/library/j-commonj-sdowmt/ComSDO monj-SDO-Specification-v1.0.pdf.) This can however be processor intensive, especially when the client may never access every node in the graph.

Figure 2A:
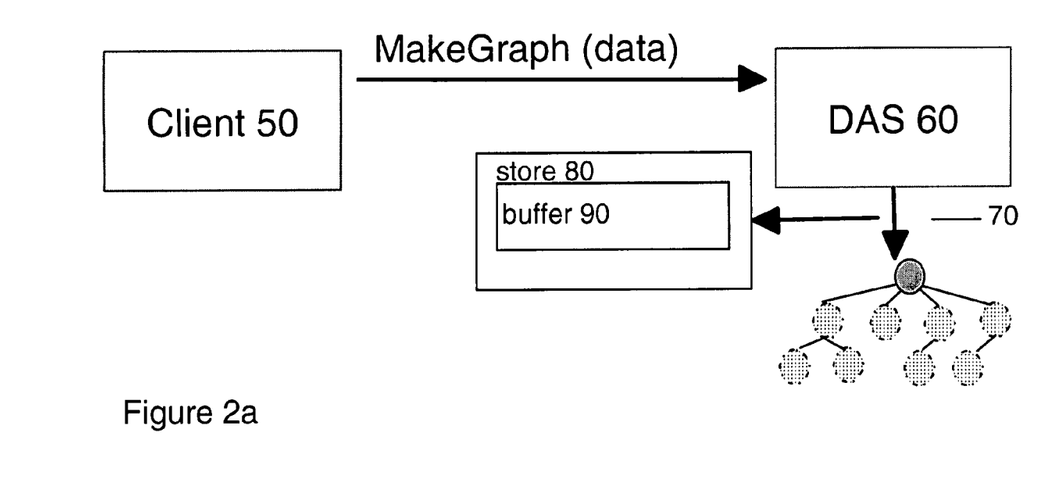
FIGS. 2a and 2b illustrate a "lazy" solution to the construction of a graph and the provision of access to portions of that graph.
Figure 2B:
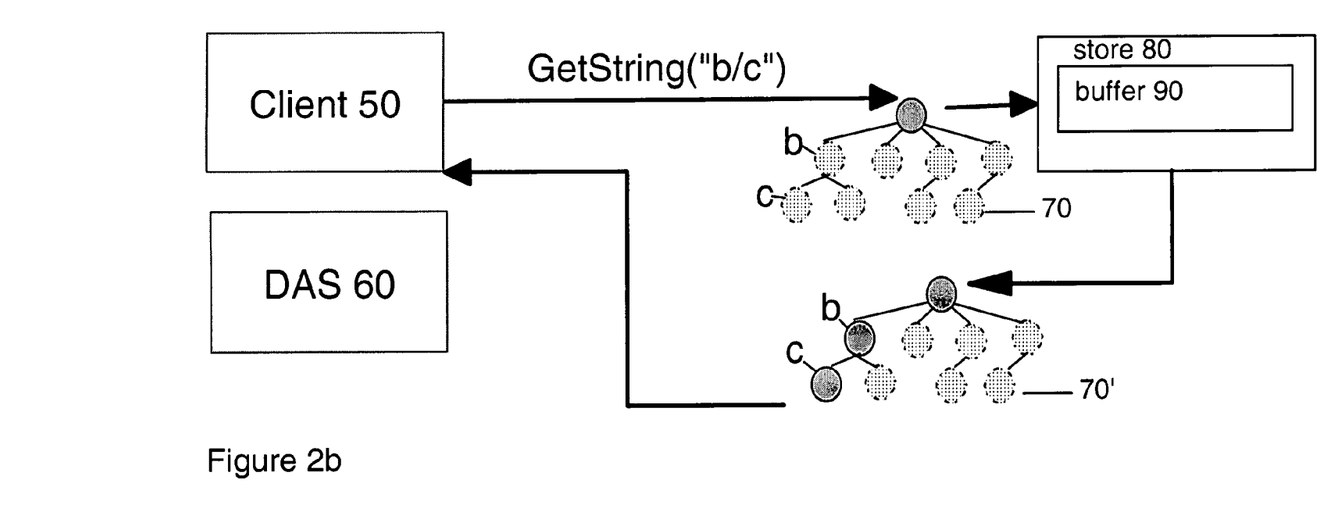

FIGS. 2a and 2b show a "lazy" solution. As before, client 50 requests that a DAS 60 converts some data "data" into a hierarchical format. A parser within the DAS parses the data to create an event pertaining to the root of the graph 70. The graph then builds the root node from this event and creates and instance of a store 80 containing a buffer 90. The graph's root node points to this store. The graph then adds the "data" into buffer 90.

Nodes are only built when a client specifically requests them. For example, FIG. 2b shows that client 50 issues a request for node "b/c". This request is received by graph 70 which points to store 80 containing buffer 90. Store 80 parses the buffer to produce the events required by the graph in order to build the nodes in the path to the requested node. In the present case this produces graph 70'. Once the requested node has been created by the graph, this is then sent back to the client 50.

Thus a better performance can be achieved by building the graph on demand rather than by expending processing power up front.

Use of a store to build a graph on demand is described in the EMF javadoc found at http://eclipse.org/emf/. The base technology is also described at: http://xml.apache.org/xerces2-j/xni-config.html In certain circumstances, a client may require the data to be in a different format to that in which it is currently stored. Numerous patents/patent applications discuss the concept of data transformation. See for example US2002073119, WO0073941 and US2004025117.

Transformation of data can be achieved by a transformation engine. There are two logical operations a transformation engine might be performing, "transcription" (i.e. transcoding) in which the same logical information is expressed in a different "wire format". In general a client would do this when it intends to forward the message to another agent. An example would be translating from English to French or XML to a legacy (or "cherished") application format. The second which is a logical transformation, changes the logical meaning of the graph, for instance it might involve changing routing information in a message.

The present invention is particularly concerned with the process for achieving data transformation when the data to be transformed is constructed lazily.

SUMMARY

According to a first aspect, the invention provides a method for producing input to a transformation engine, the method comprising: receiving a request to transform some data; determining whether the data is stored in a form permitting said data to be lazily constructed into a graph structure upon request by a client and, if the data is stored in such a form, determining whether to convert the data into a graph structure from which structure input to the transformation engine can be produced and, in the affirmative, converting the data into a graph structure and producing input to the transformation engine from this graph structure and, otherwise, producing input to the transformation engine directly from the stored data.

In other words the graph structure creation phase can be bypassed in certain circumstances.

The data could, for example, be stored in a buffer.

Preferably in order to determine whether to convert the stored data into a graph structure, it is determined whether there is a relationship between the type of data stored and the type of input to the transformation engine which is produceable from the graph structure.

If it is determined that the data should be converted into a graph structure, this is preferably done by parsing the stored data to create a first generalised form of the data (e.g. events) and the graph structure is then preferably built from the first generalised form.

In order to produce input to the transformation from this graph structure, the graph structure is preferably traversed in order to create a second generalised form of the data (e.g. events).

In some circumstances it is possible to produce input to the transformation engine directly from the stored data. In such circumstances, the stored data is preferably parsed to create a generalised form (e.g. events) which can then be input into the transformation engine.

Irrespective of whether the graph construction phase is bypassed, the input to the transformation engine will preferably be the same (assuming the original data is the same).

According to another aspect, the invention provides an apparatus for producing input to a transformation engine, the apparatus comprising: means for receiving a request to transform some data; means for determining whether the data is stored in a form permitting said data to be lazily constructed into a graph structure upon request by a client; means, responsive to the data being stored in such a form, for determining whether to convert the data into a graph structure from which structure input to the transformation engine can be produced; means, responsive to a positive determination, for converting the data into a graph structure and for producing input to the transformation engine from this graph structure; and means, responsive to a negative determination, for producing input to the transformation engine directly from the stored data.

It will be appreciated that the invention may be implemented in computer software.

BRIEF DESCRIPTION OF THE DRAWINGS

A preferred embodiment of the present invention will now be described, by way of example only, and with reference to the following drawings.

DETAILED DESCRIPTION

As described above, a client uses a Data Access Service (DAS) to convert data into a form such that it is accessible to the client. This form is a hierarchical (or other graph) structure. (The hierarchical form used in accordance with a preferred embodiment of the present invention is SDO (Service Data Objects)).

Creating a complete graph of a client's data can be processor intensive and this is wasteful if the client is unlikely to visit every node in that graph. Thus the solution is to use a lazily constructed graph where nodes in the graph are only created when a client requests access to those specific nodes.

Whilst performance is gained in some respects, this solution can however cause performance problems when a client (either the same one or another client) requests transformation of the data into a different format.

One possible (but less preferred) way of transforming lazily constructed data is explained with reference to FIGS. 3 and 4.

Figure 3:
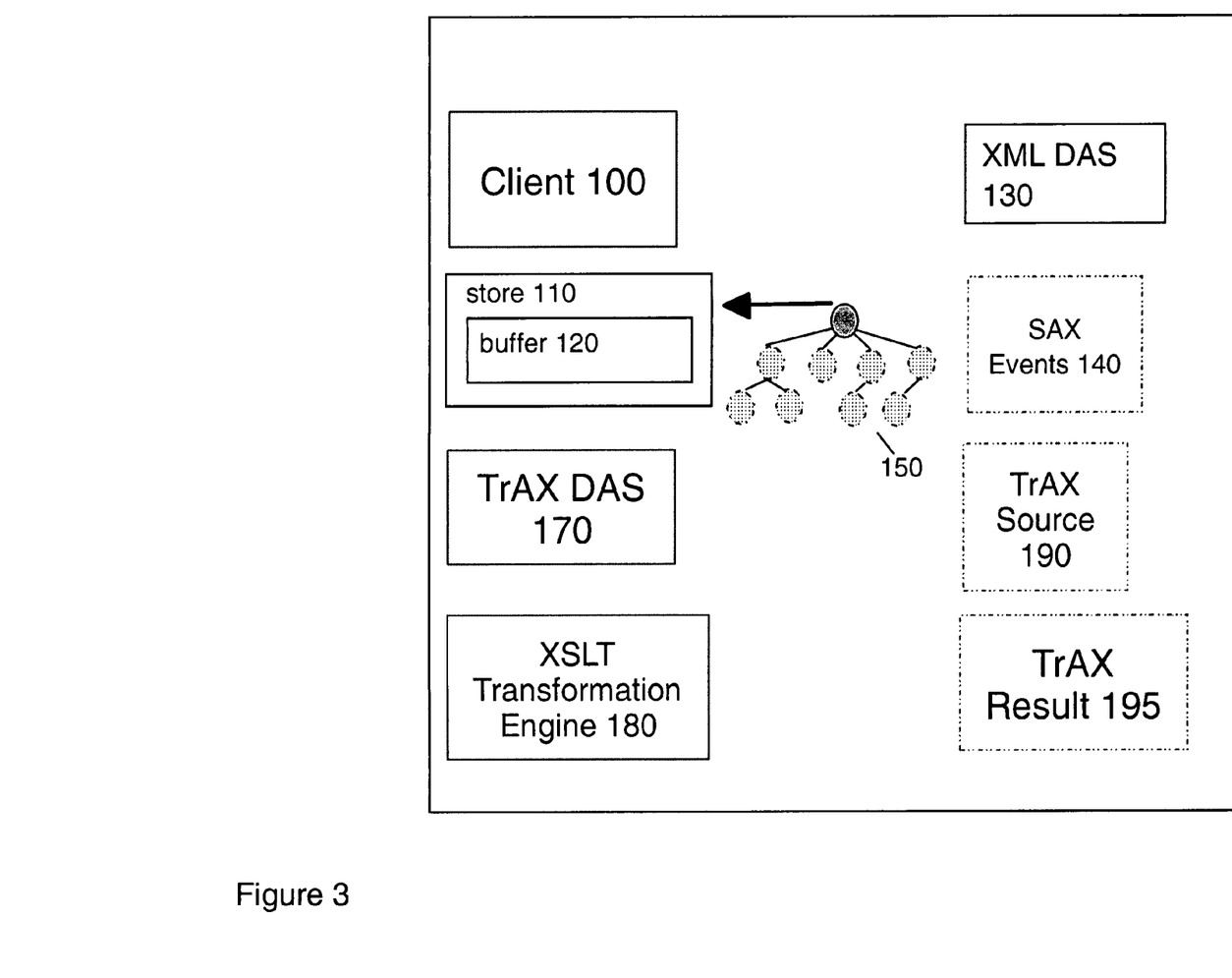
FIG. 3 shows the components involved in data transformation in accordance with one embodiment of the present invention.

FIG. 3 shows the components involved. For explanatory purposes only, the rest of the discussion will be in terms of XML.

The function/purpose of components/data such as client 100, DAS 130, store 110, buffer 120 and SAX Events 140 have all been discussed previously and so will not be discussed in any more detail. In addition to these components/data, an XSLT Transformation Engine 180 is provided. (XSLT is described at http://www.w3.org/TR/xslt.) This takes as input a "Transformation API for XML" (TrAX) Source 190 which is created by TrAX DAS 170 from graph 150. When a TrAX Source is input to Engine 180, the output (i.e. the transformed data) is placed into TrAX Result 195. This result can then be returned to client 100 as a tree of data (or more loosely a graph of data which represents a tree structure).

Figure 4:
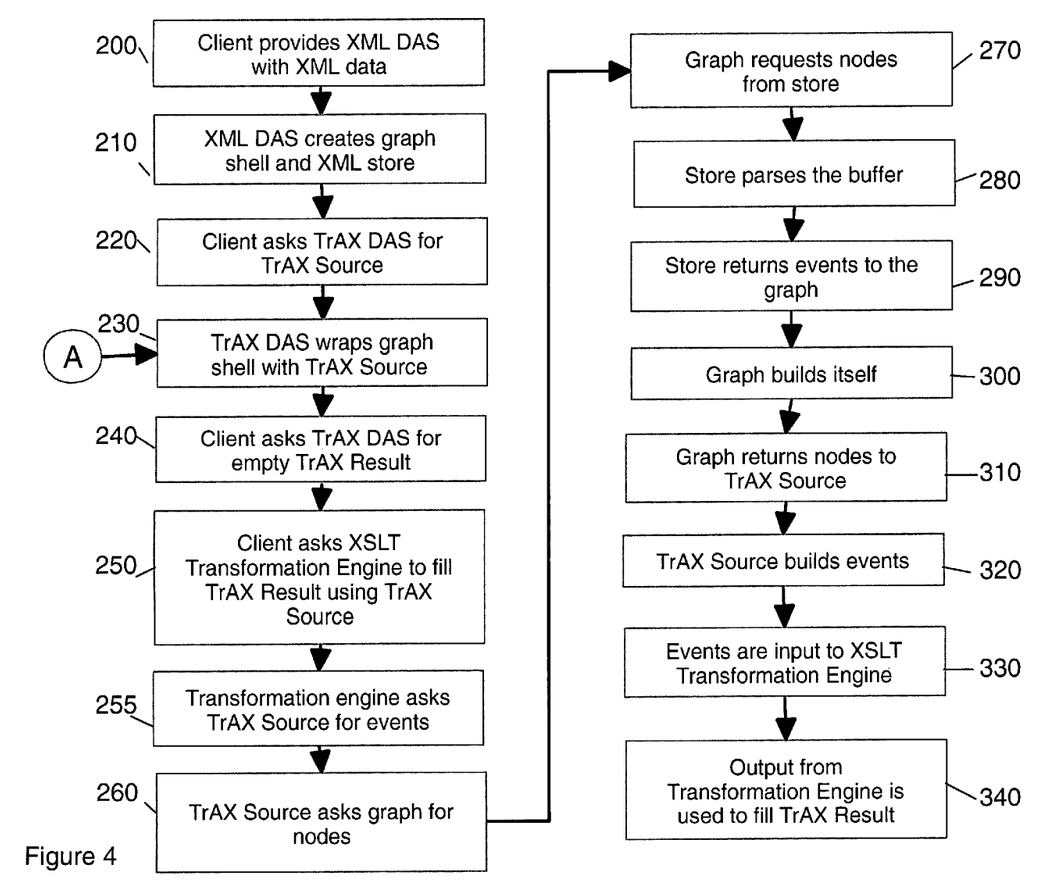
FIG. 4 shows one way of achieving a data transformation.

Note, TRAX is described at: http://java.sun.com/j2se/1.4.2/docs/api/javax/xml/transform/package-summary.html and http://xml.apache.org/xalan-j/trax.html FIG. 4 illustrates the processing that can take place (using the components described above) when a client requests that certain data is transformed into another format.

The client (or another client) has already provided the XML DAS 130 with some XML data upfront (step 200). The XML DAS produces a lazily constructed graph from this data at step 210. In other words, the DAS constructs a graph shell containing some functionality (allowing the graph to build itself) and in terms of nodes, only the root of the graph. The root is then set to point towards store 110. Buffer 120 is then filled with the XML data.

At some point, the client indicates that it requires the data to be transformed into another format. The client does this by asking the TrAX DAS for TrAX Source which can then be input into the XSLT Transformation Engine 180 (step 220). The TrAX DAS wraps the graph shell with an instance of a TrAX Source class (step 230). The client then asks the TrAX DAS for an empty TrAX Result (step 240). The client subsequently requests that the XSLT Transformation Engine fill in the empty TrAX Result using the TrAX Source (step 250). In other words, the client requests that output from the Transformation Engine is entered into the empty TrAX Result.

At step 255 the transformation engine asks the TrAX source for a sequence of events to perform the transformation on. It should be observed that this is a generic step which would be applied whatever the nature of the graph, whether it be a truly disconnected graph or a graph which is underpinned by a store supplied by some other form of DAS, or as in this case an XML based store. At step 260 the TrAX Source asks the graph for its nodes. Because the data is constructed lazily, the graph references the store 110 to request these nodes (step 270). The store then parses the buffer 120 to generate events pertaining to the requested nodes (step 280) and returns the events to the graph (step 290). The graph uses the events to build itself (step 300). Having constructed itself, the graph can then return the nodes to the TrAX Source (step 310) and the TrAX source builds events from the nodes returned to it (step 320). These events can then be input as TrAX Source to the XSLT Transformation Engine (step 330). The output of the Transformation Engine (i.e. the transformed data) is used to complete a TrAX Result for return to the client (step 340).

Thus it can be seen that the transformation of data, based upon a lazily constructed hierarchy and using the processing described above, makes for a processor intensive task.

The inventors of the present solution have realised that in certain circumstances it is possible to short-circuit the unwieldy process described with reference to FIGS. 3 and 4.

The components and processing involved in a preferred embodiment of the present invention will now be discussed with reference to FIGS. 5, 6a, 6b and 6c.

Figure 6A:
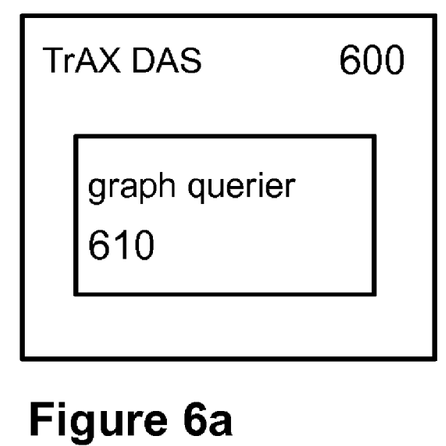

The first three steps are the same as those described with reference to FIG. 4. A client provides an XML DAS with some XML data (step 400). The XML DAS creates a graph shell (comprising some functionality enabling it to traverse and build itself and a root node) and also an XML store (step 410). The Client then asks TrAX DAS 300 for TrAX Source 370 (step 420). This is where the processing of the present invention, in accordance with a preferred embodiment, differs from that described with reference to FIG. 4.

Figure 5:
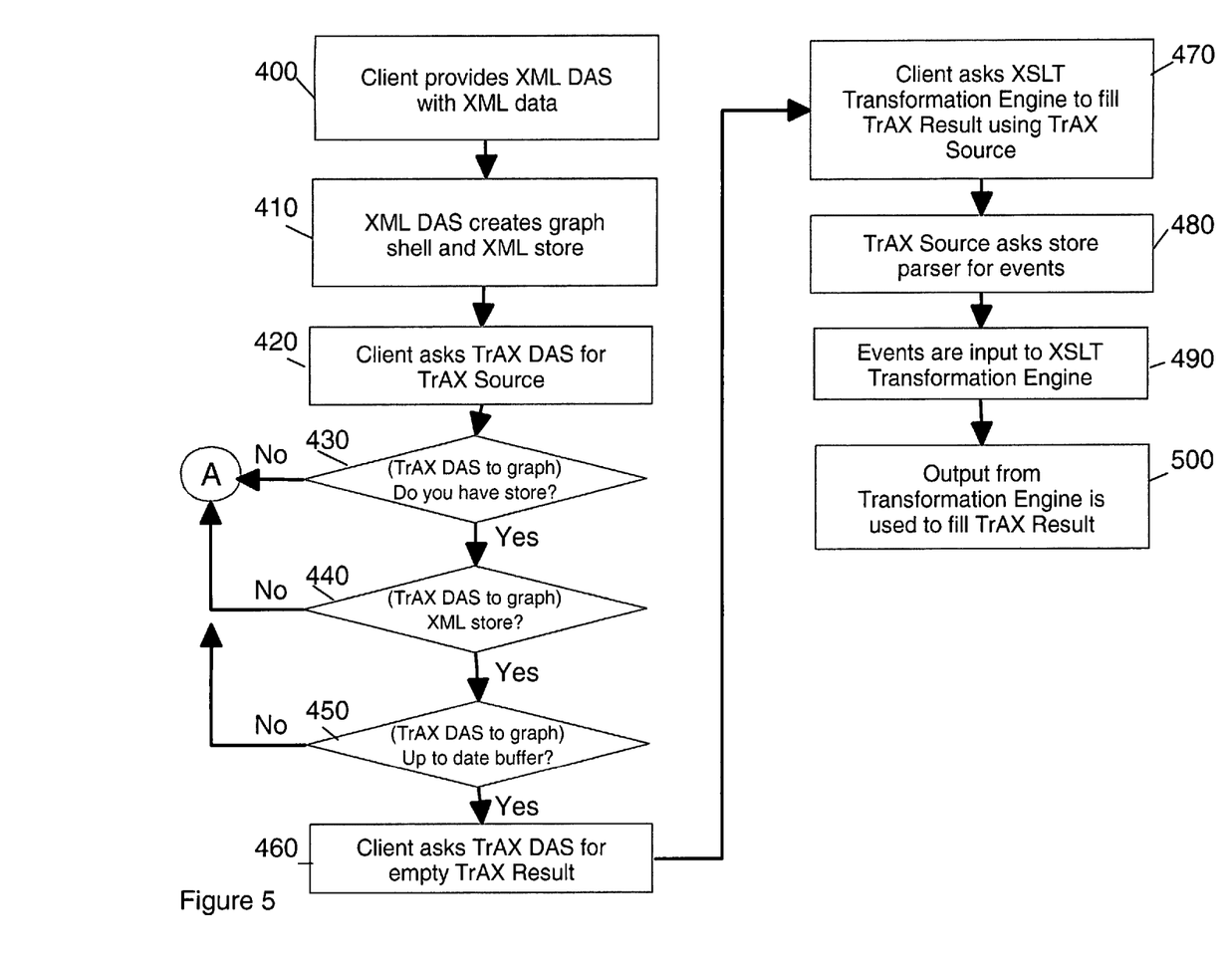
FIGS. 5, 6a, 6b and 6c illustrated the componentry and processing of the present invention, in accordance with a preferred embodiment.

At step 430, the TrAX DAS 600 asks graph 320 whether it points to a store (graph querier 610). If the answer is yes, then the TrAX DAS determines from the graph whether this is an XML store (step 440, graph querier 610) and whether the store has an up-to-date buffer (step 450, graph querier 610). Note, history information is preferably stored by the graph regarding changes made to it by the client (note changes may be made by different clients, but one is referred to here for ease). If there have been no changes, then the buffer will be up-to-date.

The above functionality is provided by the following components owned by graph 620. A store determiner 640 determines whether graph 630 has a store. Store determiner contains a store type determiner 650 which is used to determine whether any store contains an XML buffer. A store validity determiner 660 is used to determine whether any buffer is up-to-date.

If the answer to any of the questions posed by steps 430, 440, 450 is no, then the short-cut of the preferred embodiment is not possible. Instead the processing discussed with reference to FIG. 4 must be used, starting at step 230.

Figure 6B:
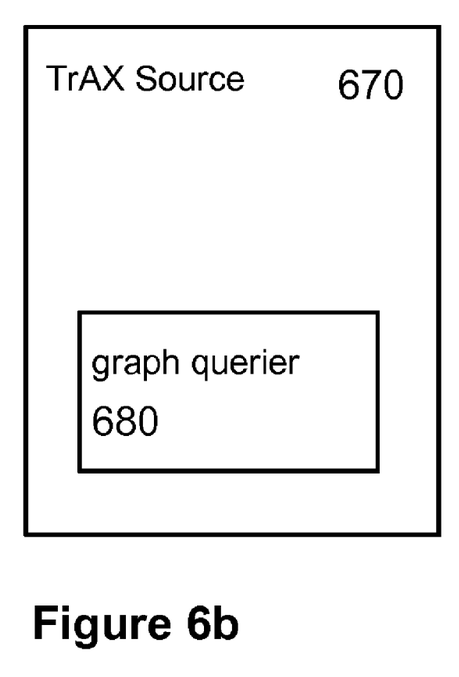
Figure 6C:
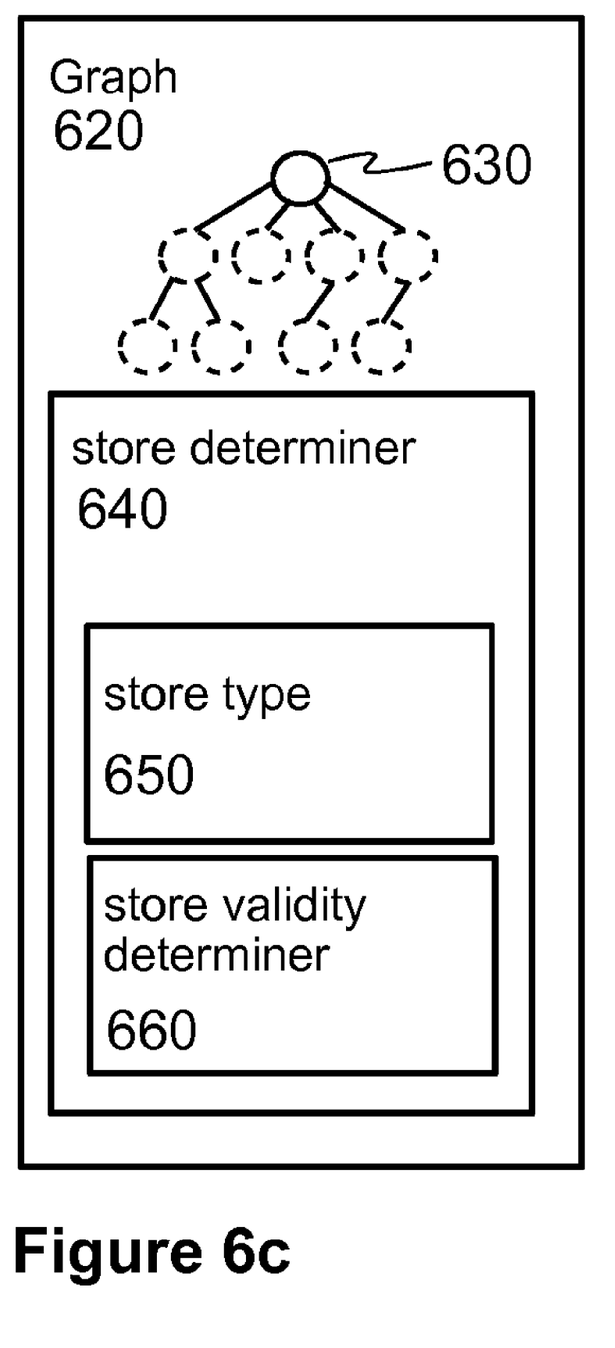

On the other hand, if the answers to steps 430, 440, 450 were all yes then at step 460 the client asks the TrAX DAS for an empty TrAX Result. The client then asks the XSLT Transformation Engine to fill the TrAX Result using TrAX Source 670 (step 470). TrAX Source 670 asks (store querier 680) the store parser (not shown) to parse the buffer in order to create events (step 480) and these are the events that are then input directly to the XSLT Transformation Engine (step 490). As before output from the Transformation Engine is used to fill the TrAX Result (step 500).

In this way, it is possible in certain circumstances to circumvent much of the processing described with reference to FIG. 4.

In the particular embodiment described, there is a special relationship between the TrAX DAS and the XML DAS that means that the events generated by parsing the buffer are suitable for direct input into the transformation engine and there is no need to create events from a hierarchical form of the data for input to the transformation engine.

It should be appreciated that whilst preferred embodiment has been described in terms of XML, the invention is not limited to such. The invention can apply to any environment in which data is normally lazily constructed into a graph structure on request by a client where the events produced by a store parser when parsing stored data are suitable for direct input to a particular transformation engine. In such situations these events can be provided to the transformation engine instead of creating a graph structure first and then using this form to generate appropriate events for input to the transformation engine.

The invention claimed is:

1. A computer-implemented method of producing input to a transformation engine comprising:
   responsive to:
      a client computer providing an extensible markup language data access service (XML DAS) computer with computer-readable XML data for transformation,
      the XML DAS computer creating a graph shell and XML store for the received XML data, and
      the client requesting a transformation application programming interface for XML data access service (TrAX DAS) computer for transformation application programming interface for XML (TrAX) source;
   but prior to inputting events into an extensible stylesheet language transformation engine (XSLT) computer and using output from the XSLT transformation engine to fill a TrAX result:
   querying by the TrAx DAS computer to the graph to determine if the graph has a store; and
   responsive to determining the graph has a store and that the store is an XML store with an up-to-date buffer:
      requesting by the client computer to the TrAX DAS computer for an empty TrAX result,
      requesting by the client computer to the XSLT transformation engine computer to fill the empty TrAX result using TrAX source, and
      the TrAX source requesting a store parser for events related to the XML store,
   wherein one or more computer-implemented steps are avoided selected from a group consisting of:
      wrapping by the TrAX DAS of a graph shell with TrAX source;
      requesting by a TrAX source of a graph for one or more nodes;
      requesting by a graph from a store for one or more nodes;
      parsing of a buffer by a store;
      returning events from a store to a graph;
      building of a graph by the same graph;
      returning nodes from a graph to a TrAX source; and
      building events by a TrAX source.

* * * * *